(12) United States Patent
Muslea et al.

(10) Patent No.: US 7,813,918 B2
(45) Date of Patent: Oct. 12, 2010

(54) IDENTIFYING DOCUMENTS WHICH FORM TRANSLATED PAIRS, WITHIN A DOCUMENT COLLECTION

(75) Inventors: Ion Muslea, El Segundo, CA (US); Kevin Knight, Marina del Rey, CA (US); Daniel Marcu, Hermosa Beach, CA (US)

(73) Assignee: Language Weaver, Inc., Los Angeles, CA (US)

( * ) Notice: Subject to any disclaimer, the term of this patent is extended or adjusted under 35 U.S.C. 154(b) by 973 days.

(21) Appl. No.: 11/197,744

(22) Filed: Aug. 3, 2005

(65) Prior Publication Data

US 2007/0033001 A1 Feb. 8, 2007

(51) Int. Cl.
G06F 17/27 (2006.01)
G06F 17/28 (2006.01)
G06F 17/20 (2006.01)

(52) U.S. Cl. .............................. 704/9; 704/1
(58) Field of Classification Search ........................ None
See application file for complete search history.

(56) References Cited

U.S. PATENT DOCUMENTS

| | | | |
|---|---|---|---|
| 4,502,128 A | 2/1985 | Okajima et al. | |
| 4,599,691 A | 7/1986 | Sakaki et al. | |
| 4,787,038 A | 11/1988 | Doi et al. | |
| 4,814,987 A | 3/1989 | Miyao et al. | |
| 4,942,526 A | 7/1990 | Okajima et al. | |
| 5,146,405 A | 9/1992 | Church | |
| 5,181,163 A | 1/1993 | Nakajima et al. | |
| 5,212,730 A | 5/1993 | Wheatley et al. | |
| 5,267,156 A | 11/1993 | Nomiyama | |
| 5,311,429 A | 5/1994 | Tominaga | |
| 5,432,948 A | 7/1995 | Davis et al. | |
| 5,477,451 A | 12/1995 | Brown et al. | |
| 5,510,981 A | 4/1996 | Berger et al. | |
| 5,644,774 A | 7/1997 | Fukumochi et al. | |
| 5,696,980 A | 12/1997 | Brew | |
| 5,724,593 A | 3/1998 | Hargrave III et al. | |
| 5,761,631 A | 6/1998 | Nasukawa | |
| 5,781,884 A | 7/1998 | Pereira et al. | |
| 5,794,178 A * | 8/1998 | Caid et al. ..................... | 704/9 |
| 5,805,832 A | 9/1998 | Brown et al. | |
| 5,848,385 A | 12/1998 | Poznanski et al. | |

(Continued)

FOREIGN PATENT DOCUMENTS

EP 0469884 A2 2/1992

(Continued)

OTHER PUBLICATIONS

Abney, Stephen, "Parsing by Chunks," 1991, Principle-Based Parsing: Computation and Psycholinguistics, vol. 44, pp. 257-279.

(Continued)

*Primary Examiner*—Matthew J Sked
(74) *Attorney, Agent, or Firm*—Carr & Ferrell LLP (57) ABSTRACT

A training system for text to text application. The training system finds groups of documents, and identifies automatically similar documents in the groups which are similar. The automatically identified documents can then be used for training of the text to text application. The comparison uses reduced size versions of the documents in order to minimize the amount of processing.

19 Claims, 2 Drawing Sheets

U.S. PATENT DOCUMENTS

| | | | |
|---|---|---|---|
| 5,867,811 A | 2/1999 | O'Donoghue | |
| 5,870,706 A | 2/1999 | Alshawi | |
| 5,903,858 A | 5/1999 | Saraki | |
| 5,987,404 A | 11/1999 | Della Pietra et al. | |
| 5,991,710 A | 11/1999 | Papineni et al. | |
| 6,031,984 A | 2/2000 | Walser | |
| 6,032,111 A | 2/2000 | Mohri | |
| 6,092,034 A * | 7/2000 | McCarley et al. | 704/2 |
| 6,119,077 A | 9/2000 | Shinozaki | |
| 6,131,082 A | 10/2000 | Hargrave III et al. | |
| 6,182,014 B1 | 1/2001 | Kenyon et al. | |
| 6,205,456 B1 | 3/2001 | Nakao | |
| 6,223,150 B1 | 4/2001 | Duan et al. | |
| 6,236,958 B1 | 5/2001 | Lange et al. | |
| 6,278,967 B1 | 8/2001 | Akers et al. | |
| 6,285,978 B1 | 9/2001 | Bernth et al. | |
| 6,289,302 B1 | 9/2001 | Kuo | |
| 6,304,841 B1 | 10/2001 | Berger et al. | |
| 6,311,152 B1 | 10/2001 | Bai et al. | |
| 6,317,708 B1 * | 11/2001 | Witbrock et al. | 704/9 |
| 6,360,196 B1 | 3/2002 | Poznanski et al. | |
| 6,389,387 B1 | 5/2002 | Poznanski et al. | |
| 6,393,388 B1 | 5/2002 | Franz et al. | |
| 6,393,389 B1 | 5/2002 | Chanod et al. | |
| 6,415,250 B1 | 7/2002 | van den Akker | |
| 6,460,015 B1 | 10/2002 | Hetherington et al. | |
| 6,502,064 B1 | 12/2002 | Miyahira et al. | |
| 6,782,356 B1 | 8/2004 | Lopke | |
| 6,810,374 B2 | 10/2004 | Kang | |
| 6,904,402 B1 | 6/2005 | Wang et al. | |
| 7,107,215 B2 | 9/2006 | Ghali | |
| 7,113,903 B1 | 9/2006 | Riccardi et al. | |
| 7,197,451 B1 * | 3/2007 | Carter et al. | 704/10 |
| 7,356,457 B2 * | 4/2008 | Pinkham et al. | 704/2 |
| 2002/0078091 A1 * | 6/2002 | Vu et al. | 707/513 |
| 2002/0188438 A1 | 12/2002 | Knight et al. | |
| 2002/0198701 A1 | 12/2002 | Moore | |
| 2004/0030551 A1 | 2/2004 | Marcu et al. | |
| 2005/0228643 A1 * | 10/2005 | Munteanu et al. | 704/9 |
| 2006/0015320 A1 * | 1/2006 | Och | 704/2 |
| 2006/0142995 A1 * | 6/2006 | Knight et al. | 704/9 |
| 2006/0150069 A1 * | 7/2006 | Chang | 715/500.1 |
| 2009/0083023 A1 * | 3/2009 | Foster et al. | 704/3 |

FOREIGN PATENT DOCUMENTS

| | | |
|---|---|---|
| EP | 0715265 A2 | 6/1996 |
| EP | 0933712 A2 | 8/1999 |
| JP | 07244666 | 1/1995 |
| JP | 10011447 | 1/1998 |
| JP | 11272672 | 10/1999 |

OTHER PUBLICATIONS

Al-Onaizan et al., "Statistical Machine Translation," 1999, JHU Summer Tech Workshop, Final Report, pp. 1-42.

Al-Onaizan, Y. and Knight, K., "Named Entity Translation: Extended Abstract" 2002, Proceedings of HLT-02, San Diego, CA.

Al-Onaizan, Y. and Knight, K., "Translating Named Entities Using Monolingual and Bilingual Resources," 2002, Proc. of the 40th Annual Meeting of the ACL,pp. 400-408.

Al-Onaizan et al., "Translating with Scarce Resources," 2000, 17th National Conference of the American Association for Artificial Intelligence, Austin, TX, pp. 672-678.

Alshawi et al., "Learning Dependency Translation Models as Collections of Finite-State Head Transducers," 2000, Computational Linguistics, vol. 26, pp. 45-60.

Arbabi et al., "Algorithms for Arabic name transliteration," Mar. 1994, IBM Journal of Research and Development, vol. 38, Issue 2, pp. 183-194.

Barnett et al., "Knowledge and Natural Language Processing," Aug. 1990, Communications of the ACM, vol. 33, Issue 8, pp. 50-71.

Bangalore, S. and Rambow, O., "Corpus-Based Lexical Choice in Natural Language Generation," 2000, Proc. of the 38th Annual ACL, Hong Kong, pp. 464-471.

Bangalore, S. and Rambow, O., "Exploiting a Probabilistic Hierarchical Model for Generation," 2000, Proc. of 18th conf. on Computational Linguistics, vol. 1, pp. 42-48.

Bangalore, S. and Rambow, O., "Evaluation Metrics for Generation," 2000, Proc. of the 1st International Natural Language Generation Conf., vol. 14, pp. 1-8.

Bangalore, S. and Rambow, O., "Using TAGs, a Tree Model, and a Language Model for Generation," May 2000, Workshop TAG+5, Paris.

Baum, Leonard, "An Inequality and Associated Maximization Technique in Statistical Estimation for Probabilistic Functions of Markov Processes", 1972, Inequalities 3:1-8.

Bikel et al., "An Algorithm that Learns What's in a Name," 1999, Machine Learning Journal Special Issue on Natural Language Learning, vol. 34, pp. 211-232.

Brants, Thorsten, "TnT—A Statistical Part-of-Speech Tagger," 2000, Proc. of the 6th Applied Natural Language Processing Conference, Seattle.

Brill, Eric. "Transformation-Based Error-Driven Learning and Natural Language Processing: A Case Study in Part of Speech Tagging", 1995, Computational Linguistics, vol. 21, No. 4, pp. 543-565.

Brown et al., "A Statistical Approach to Machine Translation," Jun. 1990, Computational Linguistics, vol. 16, No. 2, pp. 79-85.

Brown, Ralf, "Automated Dictionary Extraction for "Knowledge-Free" Example-Based Translation," 1997, Proc. of 7th Int'l Conf. on Theoretical and Methodological Issues in MT, Santa Fe, NM, pp. 111-118.

Brown et al., "The Mathematics of Statistical Machine Translation: Parameter Estimation," 1993, Computational Linguistics, vol. 19, Issue 2, pp. 263-311.

Brown et al., "Word-Sense Disambiguation Using Statistical Methods," 1991, Proc. of 29th Annual ACL, pp. 264-270.

Carl, Michael. "A Constructivist Approach to Machine Translation," 1998, New Methods of Language Processing and Computational Natural Language Learning, pp. 247-256.

Chen, K. and Chen, H., "Machine Translation: An Integrated Approach," 1995, Proc. of 6th Int'l Conf. on Theoretical and Methodological Issue in MT, pp. 287-294.

Chinchor, Nancy, "MUC-7 Named Entity Task Definition," 1997, Version 3.5.

Clarkson, P. and Rosenfeld, R., "Statistical Language Modeling Using the CMU-Cambridge Toolkit", 1997, Proc. ESCA Eurospeech, Rhodes, Greece, pp. 2707-2710.

Corston-Oliver, Simon, "Beyond String Matching and Cue Phrases: Improving Efficiency and Coverage in Discourse Analysis",1998, The AAAI Spring Symposium on Intelligent Text Summarization, pp. 9-15.

Dagan, I. and Itai, A., "Word Sense Disambiguation Using a Second Language Monolingual Corpus", 1994, Computational Linguistics, vol. 20, No. 4, pp. 563-596.

Dempster et al., "Maximum Likelihood from Incomplete Data via the EM Algorithm", 1977, Journal of the Royal Statistical Society, vol. 39, No. 1, pp. 1-38.

Diab, M. and Finch, S., "A Statistical Word-Level Translation Model for Comparable Corpora," 2000, In Proc.of the Conference on ContentBased Multimedia Information Access (RIAO).

Elhadad, M. and Robin, J., "An Overview of SURGE: a Reusable Comprehensive Syntactic Realization Component," 1996, Technical Report 96-03, Department of Mathematics and Computer Science, Ben Gurion University, Beer Sheva, Israel.

Elhadad, M. and Robin, J., "Controlling Content Realization with Functional Unification Grammars", 1992, Aspects of Automated Natural Language Generation, Dale et al. (eds)., Springer Verlag, pp. 89-104.

Elhadad et al., "Floating Constraints in Lexical Choice", 1996, ACL, 23(2): 195-239.

Elhadad, Michael, "FUF: the Universal Unifier User Manual Version 5.2", 1993, Department of Computer Science, Ben Gurion University, Beer Sheva, Israel.

Elhadad. M. and Robin, J., "SURGE: a Comprehensive Plug-in Syntactic Realization Component for Text Generation", 1999 (available at http://www.cs.bgu.ac.il/~elhadad/pub.html).

Elhadad, Michael, "Using Argumentation to Control Lexical Choice: A Functional Unification Implementation", 1992, Ph.D. Thesis, Graduate School of Arts and Sciences, Columbia University.

Fung, Pascale, "Compiling Bilingual Lexicon Entries From a Non-Parallel English-Chinese Corpus", 1995, Proc. of the Third Workshop on Very Large Corpora, Boston, MA, pp. 173-183.

Fung, P. and Yee, L., "An IR Approach for Translating New Words from Nonparallel, Comparable Texts", 1998, 36th Annual Meeting of the ACL, 17th International Conference on Computational Linguistics, pp. 414-420.

Gale, W. and Church, K., "A Program for Aligning Sentences in Bilingual Corpora," 1991, 29th Annual Meeting of the ACL, pp. 177-183.

Germann, Ulrich, "Building a Statistical Machine Translation System from Scratch: How Much Bang for the Buck Can We Expect?" Proc. of the Data-Driven MT Workshop of ACL-01, Toulouse, France, 2001.

Germann et al., "Fast Decoding and Optimal Decoding for Machine Translation", 2001, Proc. of the 39th Annual Meeting of the ACL, Toulouse, France, pp. 228-235.

Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.

Grefenstette, Gregory, "The World Wide Web as a Resource for Example-Based Machine Translation Tasks", 1999, Translating and the Computer 21, Proc. of the 21st International Conf. on Translating and the Computer, London, UK, 12 pp.

Hatzivassiloglou, V. et al., "Unification-Based Glossing", 1995, Proc. of the International Joint Conference on Artificial Intelligence, pp. 1382-1389.

Ide, N. and Veronis, J., "Introduction to the Special Issue on Word Sense Disambiguation: The State of the Art", Mar. 1998, Computational Linguistics, vol. 24, Issue 1, pp. 2-40.

Imamura, Kenji, "Hierarchical Phrase Alignment Harmonized with Parsing", 2001; in Proc. of NLPRS, Tokyo.

Jelinek, F., "Fast Sequential Decoding Algorithm Using a Stack", Nov. 1969, IBM J. Res. Develop., vol. 13, No. 6, pp. 675-685.

Jones, K. Sparck, "Experiments in Relevance Weighting of Search Terms", 1979, Information Processing & Management, vol. 15, Pergamon Press Ltd., UK, pp. 133-144.

Knight, K. and Yamada, K., "A Computational Approach to Deciphering Unknown Scripts," 1999, Proc. of the ACL Workshop on Unsupervised Learning in Natural Language Processing.

Knight, K. and Al-Onaizan, Y., "A Primer on Finite-State Software for Natural Language Processing", 1999 (available at http://www.isi.edu/licensed-sw/carmel).

Knight, Kevin, "A Statistical MT Tutorial Workbook," 1999, JHU Summer Workshop (available at http://www.isi.edu/natural-language/mt/wkbk.rtf).

Knight, Kevin, "Automating Knowledge Acquisition for Machine Translation," 1997, AI Magazine 18(4).

Knight, K. and Chander, I., "Automated Postediting of Documents,"1994, Proc. of the 12th Conference on Artificial Intelligence, pp. 779-784.

Knight, K. and Luk, S., "Building a Large-Scale Knowledge Base for Machine Translation," 1994, Proc. of the 12th Conference on Artificial Intelligence, pp. 773-778.

Knight, Kevin, "Connectionist Ideas and Algorithms," Nov. 1990, Communications of the ACM, vol. 33, No. 11, pp. 59-74.

Knight, Kevin, "Decoding Complexity in Word-Replacement Translation Models", 1999, Computational Linguistics, 25(4).

Knight et al., "Filling Knowledge Gaps in a Broad-Coverage Machine Translation System", 1995, Proc. of the 14th International Joint Conference on Artificial Intelligence, Montreal, Canada, vol. 2, pp. 1390-1396.

Knight, Kevin, "Integrating Knowledge Acquisition and Language Acquisition," May 1992, Journal of Applied Intelligence, vol. 1, No. 4.

Knight et al., "Integrating Knowledge Bases and Statistics in MT," 1994, Proc. of the Conference of the Association for Machine Translation in the Americas.

Knight, Kevin, "Learning Word Meanings by Instruction,"1996, Proc. of the National Conference on Artificial Intelligence, vol. 1, pp. 447-454.

Knight, K. and Graehl, J., "Machine Transliteration", 1997, Proc. of the ACL-97, Madrid, Spain.

Knight, K. et al., "Machine Transliteration of Names in Arabic Text," 2002, Proc. of the ACL Workshop on Computational Approaches to Semitic Languages.

Knight, K. and Marcu, D., "Statistics-Based Summarization—Step One: Sentence Compression," 2000, American Association for Artificial Intelligence Conference, pp. 703-710.

Knight, K. et al., "Translation with Finite-State Devices," 1998, Proc. of the 3rd AMTA Conference, pp. 421-437.

Knight, K. and Hatzivassiloglou, V., "Two-Level, Many-Paths Generation," 1995, Proc. of the 33rd Annual Conference of the ACL, pp. 252-260.

Knight, Kevin, "Unification: A Multidisciplinary Survey," 1989, ACM Computing Surveys, vol. 21, No. 1.

Koehn, P. and Knight, K., "ChunkMT: Statistical Machine Translation with Richer Linguistic Knowledge," Apr. 2002, Information Sciences Institution.

Koehn, P. and Knight, K., "Estimating Word Translation Probabilities from Unrelated Monolingual Corpora Using the EM Algorithm," 2000, Proc. of the 17th meeting of the AAAI.

Koehn, P. and Knight, K., "Knowledge Sources for Word-Level Translation Models,".2001, Conference on Empirical Methods in Natural Language Processing.

Kurohashi, S. and Nagao, M., "Automatic Detection of Discourse Structure by Checking Surface Information in Sentences," 1994, Proc. of COL-LING '94, vol. 2, pp. 1123-1127.

Langkilde-Geary, Irene, "An Empirical Verification of Coverage and Correctness for a General-Purpose Sentence Generator," 1998, Proc. 2nd Int'l Natural Language Generation Conference.

Langkilde-Geary, Irene, "A Foundation for General-Purpose Natural Language Generation: Sentence Realization Using Probailistic Models of Language," 2002, Ph.D. Thesis, Faculty of the Graduate School, University of Southern California.

Langkilde, Irene, "Forest-Based Statistical Sentence Generation," 2000, Proc. of the 1st Conference on North American chapter of the ACL, Seattle, WA, pp. 170-177.

Langkilde, I. and Knight, K., "The Practical Value of N-Grams in Generation," 1998, Proc. of the 9th International Natural Language Generation Workshop, pp. 248-255.

Langkilde, I. and Knight, K., "Generation that Exploits Corpus-Based Statistical Knowledge," 1998, Proc. of the COLING-ACL, pp. 704-710.

Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.

Manning, C. and Schutze, H., "Foundations of Statistical Natural Language Processing," 2000, the MIT Press, Cambridge, MA [redacted].

Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.

Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.

Marcu, Daniel, "Discourse trees are good indicators of importance in text," 1999, Advances in Automatic Text Summarization, the MIT Press, Cambridge, MA.

Marcu, Daniel, "Instructions for Manually Annotating the Discourse Structures of Texts," 1999, Discourse Annotation, pp. 1-49.

Marcu, Daniel, "The Rhetorical Parsing of Natural Language Texts," 1997, Proceedings of ACL/EACL '97, pp. 96-103.

Marcu, Daniel, "The Rhetorical Parsing, Summarization, and Generation of Natural Language Texts," 1997, Ph.D. Thesis, Graduate Department of Computer Science, University of Toronto.

Marcu, Daniel, "Towards a Unified Approach to Memory- and Statistical-Based Machine Translation," 2001, Proc. of the 39th Annual Meeting of the ACL, pp. 378-385.

Melamed, I. Dan, "A Word-to-Word Model of Translational Equivalence," 1997, Proc. of the 35th Annual Meeting of the ACL, Madrid, Spain, pp. 490-497.

Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.

Melamed, I. Dan, "Empirical Methods for Exploiting Parallel Texts," 2001, MIT Press, Cambridge, MA [table of contents].

Meng et al., "Generating Phonetic Cognates to Handle Named Entities in English-Chinese Cross-Language Spoken Document Retrieval," 2001, IEEE Workshop on Automatic Speech Recognition and Understanding, pp. 311-314.

Miike et al., "A full-text retrieval system with a dynamic abstract generation function," 1994, Proceedings of SI-GIR '94, pp. 152-161.

Mikheev et al., "Named Entity Recognition without Gazeteers," 1999, Proc. of European Chapter of the ACL, Bergen, Norway, pp. 1-8.

Monasson et al., "Determining computational complexity from characteristic 'phase transitions'," Jul. 1999, Nature Magazine, vol. 400, pp. 133-137.

Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.

Niessen, S. and Ney, H, "Toward hierarchical models for statitical machine translation of inflected languages," 2001, Data-Driven Machine Translation Workshop, Toulouse, France, pp. 47-54.

Och, F. and Ney, H, "Improved Statistical Alignment Models," 2000, 38th Annual Meeting of the ACL, Hong Kong, pp. 440-447.

Och et al., "Improved Alignment Models for Statistical Machine Translation," 1999, Proc. of the Joint Conf. of Empirical Methods in Natural Language Processing and Very Large Corpora, pp. 20-28.

Papineni et al., "Bleu: a Method for Automatic Evaluation of Machine Translation," 2001, IBM Research Report, RC22176(W0102-022).

Pla et al., "Tagging and Chunking with Bigrams," 2000, Proc. of the 18th Conference on Computational Linguistics, vol. 2, pp. 614-620.

Rapp, Reinhard, Automatic Identification of Word Translations from Unrelated English and German Corpora, 1999, 37th Annual Meeting of the ACL, pp. 519-526.

Rapp, Reinhard, "Identifying Word Translations in Non-Parallel Texts," 1995, 33rd Annual Meeting of the ACL, pp. 320-322.

Resnik, P. and Yarowsky, D., "A Perspective on Word Sense Disambiguation Methods and Their Evaluation," 1997, Proceedings of SIGLEX '97, Washington, DC, pp. 79-86.

Resnik, Philip, "Mining the Web for Bilingual Text," 1999, 37th Annual Meeting of the ACL, College Park, MD, pp. 527-534.

Rich, E. and Knight, K., "Artificial Intelligence, Second Edition," 1991, McGraw-Hill Book Company [redacted].

Richard et al., "Visiting the Traveling Salesman Problem with Petri nets and application in the glass industry," Feb. 1996, IEEE Emerging Technologies and Factory Automation, pp. 238-242.

Robin, Jacques, "Revision-Based Generation of Natural Language Summaries Providing Historical Background: Corpus-Based Analysis, Design Implementation and Evaluation," 1994, Ph.D. Thesis, Columbia University, New York.

Sang, E. and Buchholz, S., "Introduction to the CoNLL-2000 Shared Task: Chunking," 20002, Proc. of CoNLL-2000 and LLL-2000, Lisbon, Portugal, pp. 127-132.

Schmid, H., and Walde, S., "Robust German Noun Chunking With a Probabilistic Context-Free Grammar," 2000, Proc. of the 18th Conference on Computational Linguistics, vol. 2, pp. 726-732.

Selman et al., "A New Method for Solving Hard Satisfiability Problems," 1992, Proc. of the 10th National Conference on Artificial Intelligence, San Jose, CA, pp. 440-446.

Schutze, Hinrich, "Automatic Word Sense Discrimination," 1998, Computational Linguistics, Special Issue on Word Sense Disambiguation, vol. 24, Issue 1, pp. 97-123.

Sobashima et al., "A Bidirectional Transfer-Driven Machine Translation System for Spoken Dialogues," 1994, Proc. of 15th Conference on Computational Linguistics, vol. 1, pp. 64-68.

Shapiro, Stuart (ed.), "Encyclopedia of Artificial Intelligence, 2nd edition", vol. 2, 1992, John Wiley & Sons Inc; "Unification" article, K. Knight, pp. 1630-1637.

Soricut et al., "Using a large monolingual corpus to improve translation accuracy," 2002, Lecture Notes In Computer Science, vol. 2499, Proc. of the 5th Conference of the Association for Machine Translation in the Americas on Machine Translation: From Research to Real Users, pp. 155-164.

Stalls, B. and Knight, K., "Translating Names and Technical Terms in Arabic Text," 1998, Proc. of the COLING/ACL Workkshop on Computational Approaches to Semitic Language.

Sun et al., "Chinese Named Entity Identification Using Class-based Language Model," 2002, Proc. of 19th International Conference on Computational Linguistics, Taipei, Taiwan, vol. 1, pp. 1-7.

Sumita et al., "A Discourse Structure Analyzer for Japanese Text," 1992, Proc. of the International Conference on FIfth Generation Computer Systems, vol. 2, pp. 1133-1140.

Taylor et al., "The Penn Treebank: An Overview," in A. Abeill (ed.), Treebanks: Building and Using Parsed Corpora, 2003, pp. 5-22.

Tiedemann, Jorg, "Automatic Construction of Weighted String Similarity Measures," 1999, In Proceedings of the Joint SIGDAT Conference on Emperical Methods in Natural Language Processing and Very Large Corpora.

Tillmann et al., "A DP based Search Using Monotone Alignments in Statistical Translation," 1997, Proc. of the Annual Meeting of the ACL, pp. 366-372.

Tillman, C. and Xia, F., "A Phrase-Based Unigram Model for Statistical Machine Translation," 2003, Proc. of the North American Chapter of the ACL on Human Language Technology, vol. 2, pp. 106-108.

Veale, T. and Way, A., "Gaijin: A Bootstrapping, Template-Driven Approach to Example-Based MT," 1997, Proc. of New Methods in Natural Language Processing (NEMPLP97), Sofia, Bulgaria.

Vogel, S. and Ney, H., "Construction of a Hierarchical Translation Memory," 2000, Proc. of Cooling 2000, Saarbrucken, Germany, pp. 1131-1135.

Vogel et al., "The CMU Statistical Machine Translation System," 2003, Machine Translation Summit IX, New Orleans, LA.

Vogel et al., "The Statistical Translation Module in the Verbmobil System," 2000, Workshop on Multi-Lingual Speech Communication, pp. 69-74.

Wang, Ye-Yi, "Grammar Interference and Statistical Machine Translation," 1998, Ph.D Thesis, Carnegie Mellon University, Pittsburgh, PA.

Watanbe et al., "Statistical Machine Translation Based on Hierarchical Phrase Alignment," 2002, 9th International Conference on Theoretical and Methodological Issues in Machin Translation (TMI-2002), Keihanna, Japan, pp. 188-198.

Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.

Wang, Y. and Waibel, A., "Decoding Algorithm in Statistical Machine Translation," 1996, Proc. of the 35th Annual Meeting of the ACL, pp. 366-372.

Wu, Dekai, "Stochastic Inversion Transduction Grammars and Bilingual Parsing of Parallel Corpora," 1997, Computational Linguistics, vol. 23, Issue 3, pp. 377-403.

Wu, Dekai, "A Polynomial-Time Algorithm for Statistical Machine Translation," 1996, Proc. of 34th Annual Meeting of the ACL, pp. 152-158.

Yamada, K. and Knight, K., "A Decoder for Syntax-based Statistical MT," 2001, Proceedings of the 40th Annual Meeting of the ACL, pp. 303-310.

Yamada, K. and Knight, K. "A Syntax-based Statistical Translation Model," 2001, Proc. of the 39th Annual Meeting of the ACL, pp. 523-530.

Yamamoto et al., "A Comparative Study on Translation Units for Bilingual Lexicon Extraction," 2001, Japan Academic Association for Copyright Clearance, Tokyo, Japan.

Yarowsky, David, "Unsupervised Word Sense Disambiguation Rivaling Supervised Methods," 1995, 33rd Annual Meeting of the ACL, pp. 189-196.

Callan et al., "TREC and TIPSTER Experiments with Inquery," 1994, Information Processing and Management, vol. 31, Issue 3, pp. 327-343.

Cohen, Yossi, "Interpreter for FUF," (available at ftp://ftp.cs.bgu.ac.il/pub/people/elhadad/fuf-life.lf).

Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.

Nederhof, M. and Satta, G., "IDL-Expressions: A Formalism for Representing and Parsing Finite Languages in Natural Language Processing," 2004, Journal of Artificial Intelligence Research, vol. 21, pp. 281-287.

Och, F. and Ney, H., "Discriminative Training and Maximum Entropy Models for Statistical Machine Translation," 2002, Proc. of the 40th Annual Meeting of the ACL, Philadelphia, PA, pp. 295-302.

Resnik, P. and Smith, A., "The Web as a Parallel Corpus," Sep. 2003, Computational Linguistics, Special Issue on Web as Corpus, vol. 29, Issue 3, pp. 349-380.

Russell, S. and Norvig, P., "Artificial Intelligence: A Modern Approach," 1995, Prentice-Hall, Inc., New Jersey [redacted—table of contents].

Ueffing et al., "Generation of Word Graphs in Statistical Machine Translation," 2002, Proc. of Empirical Methods in Natural Language Processing (EMNLP), pp. 156-163.

Kumar, R. and Li, H., "Integer Programming Approach to Printed Circuit Board Assembly Time Optimization," 1995, IEEE Transactions on Components, Packaging, and Manufacturing, Part B: Advance Packaging, vol. 18, No. 4, pp. 720-727.

* cited by examiner

IDENTIFYING DOCUMENTS WHICH FORM TRANSLATED PAIRS, WITHIN A DOCUMENT COLLECTION

GOVERNMENT INTERESTS

This invention was made with government support under Contract No. N66001-00-1-8914 awarded by the Space and Naval Warfare Systems Command. The U.S. government has certain rights in the claimed inventions.

BACKGROUND

Text to text applications include machine translation, automated summarization, question answering, and other similar applications where a machine carries out the function of understanding some kind of input information, and generating text. The input information is often "text", but more generally, can be any kind of information that is received and understandable by the machine.

Conventional text to text applications use heterogeneous methods for implementing the generation phase. Machine translation often produces sentences using application-specific decoders that are based on work that was conducted on speech recognition. Automated summarization produces abstracts using task specific strategies.

Machine translation systems rely on training that is carried out based on corresponding, or "parallel" information that exists in both of two languages. The information in the two languages can be from many sources. Sometimes, it is known that the contents of two documents represent the same information.

The internet is a source of information. Documents on the Internet are often available in multiple different languages. However, it may be difficult to identify mutual translations within the many different web pages on the Internet. Comparing all documents within the document pool using conventional systems would require a number of computations that scales with the square of the number of document pairs.

For example, each English language page can be compared with every known French language page, to determine the best match. This naive system would take extreme computation times to identify the training pairs.

Philip Resnik has suggested a method which identifies parallel documents by producing pairs of similar URLs which are presumed to be in different languages. For example, if one URL says "En", and another URL is similar but differs only by stating "FR", then these are presumed to be parallel URLs.

Not all Web documents are in this form, and Resnik's system is quite specific to web pages which have that specific kinds of URLs.

SUMMARY

The present application teaches a system that forms a similarity measure that returns a score given a document pair. Techniques are disclosed which scale n*log n with the number of documents.

One aspect forms a reduced-size version of the document that is associated with the document contents, and compares that reduced size version, with comparably reduced sized versions in other languages. The reduced size document can be a document fingerprint.

Another aspect compares the documents using a probabilistic shuffling technique, where the documents and contents are mixed, and then compared to some, but not all, information about other documents. The shuffling may be carried out numerous times, in order to obtain a best match.

DETAILED DESCRIPTION

The general structure and techniques, and more specific embodiments which can be used to effect different ways of carrying out the more general goals are described herein.

Figure 1:
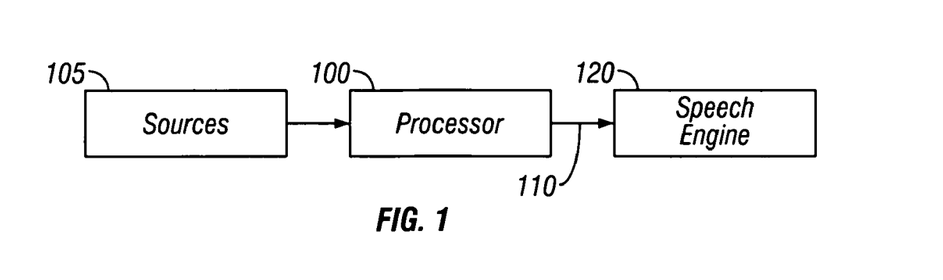
FIG. 1 shows a block diagram of a system.

FIG. 1 illustrates an exemplary hardware device and its flow, which may execute the operations that are described with reference to the flowcharts. This system can be used for any text to text application. However, the embodiment discloses the specific application of machine translation.

A processor is assumed to have access to various sources 105. The sources may be parallel corpora of multiple language information. Specifically, the sources may include translation memories, probabilistic and non-probabilistic word- and phrase-based dictionaries, glossaries, Internet information, parallel corpora in multiple languages, non-parallel corpora in multiple languages having similar subject matter, and human-created translations. The processor creates training data 110.

Speech engine 120 carries out a text-to-text application based on the training data.

The present application teaches a system of identifying mutual translations within a collection of documents such as 105. The documents are assumed to be in first and second languages.

A first embodiment describes the first and second languages as being English and French. It should be understood, however, that any first and second languages could be used. The language information is used to train a machine based text to text system. That system can be machine translation, automated summarization, speech recognition, or any other machine application.

Data from the Web can be gathered by focused crawling. Alternatively, other data can be obtained. The data includes a collection of information in first and second languages that does not necessarily have any subject matter connection. This data is used as the input to the system.

Figure 2:
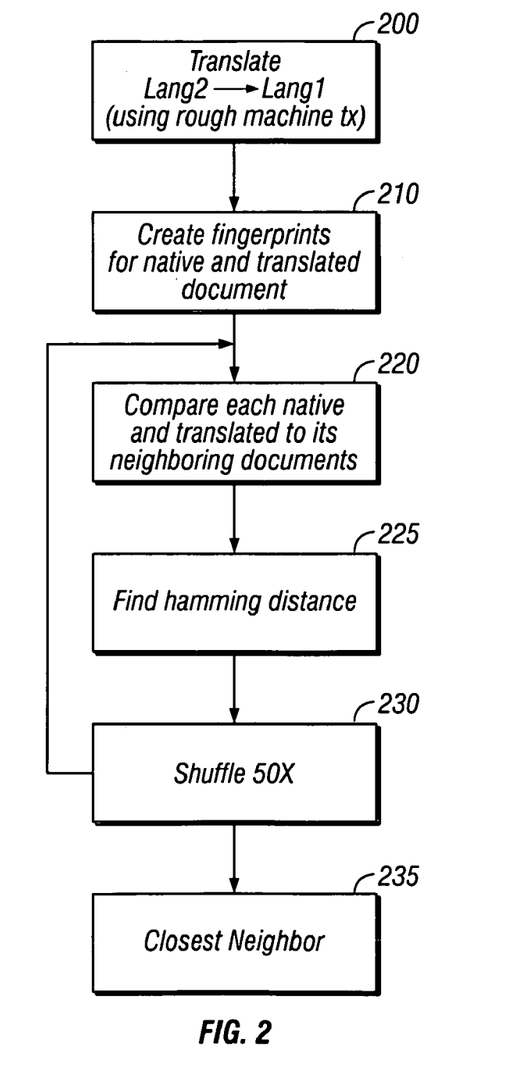
FIG. 2 shows a flowchart of operation to find parallel information.

The processing computer operates to find mutual translations according to the flowchart of FIG. 2. At 200, each of the French language documents are translated into English using a rough machine translator. This rough translation is done quickly, and makes an adequate, but not perfect, translation. The translation technique which is used at 200 is optimized for speed, not for accuracy. This translation produces two sets of documents in the same language: here English. One of those sets of documents is the original English document, called herein the native documents. The other set of documents is the translated documents.

At 210, reduced size versions of the documents are created for both the native and translated documents. The reduced size version has parts that are associated with the document contents. The reduced size document can be a document fingerprint. The fingerprint has "keys" that relate to words and their placement in the dictionaries. In effect, this summarizes concisely information about the words contained in the document.

Figure 3:
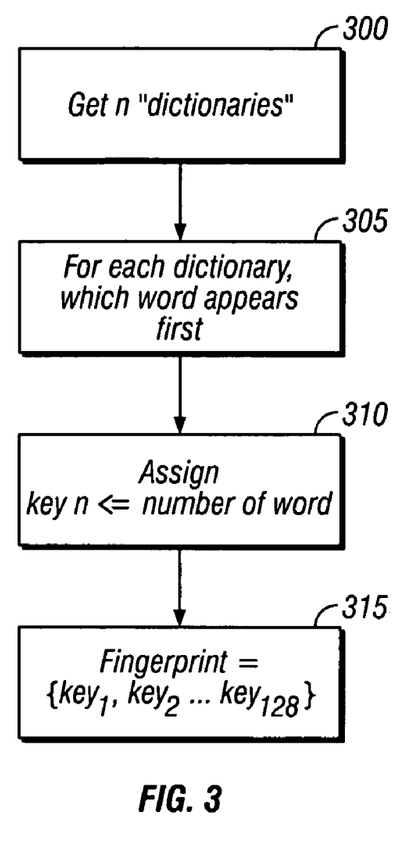
FIG. 3 shows a flowchart of an embodiment of determining the signatures of the documents.

Different techniques of forming fingerprints may be used, and one specific technique is described herein with reference to FIG. 3. At 300, n dictionaries are obtained. A dictionary can be any grouping of words, which includes the words in the language of the documents. The dictionaries can be conventional dictionaries, or any other collection of words. Each of the dictionaries will have different words in different orders. At 305, the system identifies which word in the document appears first, or at some specified location, within each dictionary. The number of that word in the document is assigned to a key that corresponds to the dictionary, at 310. Each dictionary will be different, and therefore, each dictionary will form a different key. Each of the keys will be associated with the document contents.

The keys collectively form a fingerprint. A typical system of this type may use 128 different dictionaries, and hence the fingerprint, shown in 315 is formed of 128 different keys. Each document will form a unique set of keys, and conversely, the keys effectively form a signature that allows identification of the document. Any other type signature which identifies the document can alternatively be used. At 220, each of the native and translated documents is compared to its neighboring document, that is not to all documents in the database, but only to specified neighboring documents. The comparison may use, for example, a fast Hamming matching. The comparison may only be to the left and right neighbors, or may alternatively be to 2-5 left and right nearest neighbors, or to some other number of neighbors. The Hamming distance is found at 225 and represents how many pieces of the pair of fingerprints do not match.

Even a document and its identical translation would not match exactly because of imperfections in the translator, for example. The Hamming distance indicates the amount by which the fingerprints do not match.

At 230, a shuffle is carried out, in which the order of the keys within the native and translated fingerprints are shuffled randomly. After shuffling, the documents are sorted at 235, according to fingerprints. The documents are again compared to their nearest neighbor(s) at 225. Flow continues until a desired match is obtained. The output is the closest neighbor at 240.

The shuffle operation uses statistical properties to find the nearest neighbor. For a database with 1,000 documents, for example, the shuffle can find the nearest neighbor after approximately 50 shuffles.

The SHUFFLE process is done so that the keys can be sorted in a way that brings similar items "nearby", so that they get compared.

For example, consider the following two 5-key signatures:
doc-1: 1 0 3 4 5
doc-2: 1 9 3 4 5
These two docs are quite similar because they differ only in one key (ie, 0 vs 9).

However, the ordering of the documents may be very different, depending on the key order. A worst-case shuffle, for example, may lead to the following key re-ordering:
doc-1: 0 1 3 4 5
doc-2: 9 1 3 4 5

When documents are sorted according to their keys and according to this worst case scenario, doc-1 & doc-2 are likely to be very far apart. An example sorting might be:
doc-1: 0 1 3 4 5
. . .
doc-11: 2 0 3 4 5
doc-12: 2 9 3 4 5
doc-13: 3 0 3 4 5
doc-22: 4 9 3 4 5
doc-17: 4 0 3 4 5
doc-29: 5 9 3 4 9
. . .
doc-2: 9 1 3 4 5

In contrast, a best-case shuffle will put the like keys in agreement, for example, a best case shuffle might be:
doc-1: 1 3 4 5 0
doc-2: 1 3 4 5 9

In this case, after sorting, the documents will be very close.

Figure 4:
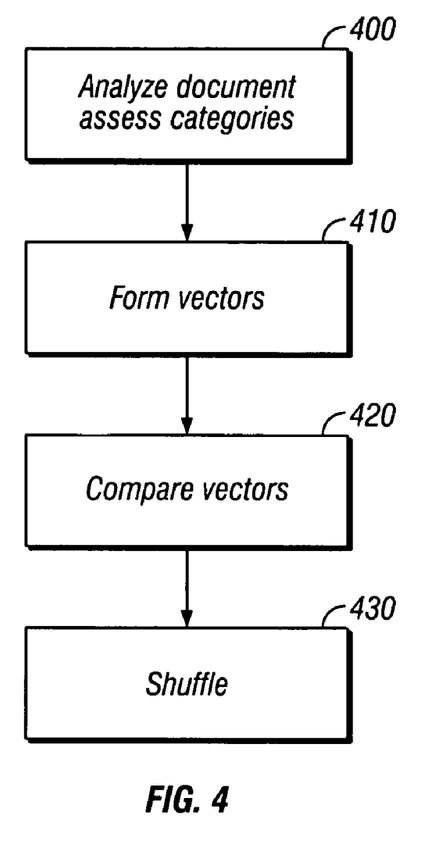
FIG. 4 shows a flowchart of another embodiment.

Another embodiment is described with reference to the flowchart of FIG. 4. This embodiment does not require a rough translation, but instead compares aspects of the documents that are in the document collection.

At 400, each document in the collection is analyzed according to an assessment vector technique. The analysis may look for any category or feature within each document. For example, the assess operation at 400 may maintain a detection of the number of times that a specified word is used, and keep counts of those multiple uses. The analyzed information is used to form vectors indicative of the documents. In this embodiment, the vectors form the reduced versions.

The vectors can be native, or may use a translation technique. For example, a word frequency vector can be used for English documents, while a modified word frequency vector can be used place the words from the French document into the English space.

At 420, the vectors are compared and shuffled at 430 using similar techniques to those in a previous embodiment.

According to exemplary embodiments, a processor may determine reduced size versions of documents such as those that may be included in a database. A processor may also compare the reduced size versions to determine documents that represent similar information. Additionally, a text-to-text application module may use documents that represent similar information to train a text-to-text application. The text-to-text application may be a machine translation system in some embodiments. Furthermore, the text-to-text application may carry out a rough translation of documents to form a group of translated documents.

Although only a few embodiments have been disclosed in detail above, other embodiments are possible and are intended to be encompassed within this specification. The specification describes specific examples to accomplish a more general goal that may be accomplished in other way. This disclosure is intended to be exemplary, and the claims are intended to cover any modification or alternative which might be predictable to a person having ordinary skill in the art. For example, the above techniques can be used with other sources of information, other languages, and other signature techniques.

Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method for identifying documents that represent similar information to train a text-to-text application, the method comprising:
   obtaining a group of documents;
   determining reduced size versions of the documents, wherein the reduced size versions summarize information about words contained in the documents and the determining is performed by a processor;
   changing an order of information within the reduced size versions;
   sorting the reduced size versions;

comparing the reduced size versions to determine documents that represent similar information, wherein the comparing is performed by a processor; and using the documents that represent similar information for training for the text-to-text application.

2. The method of claim 1, wherein the text-to-text application is a machine translation system.

3. The method of claim 1, further comprising:

carrying out a rough translation to a second language of documents in the group to form a group of translated documents; and comparing the group of translated documents to other documents prior to the determining.

4. The method of claim 1, wherein determining the reduced size versions comprises:

forming vectors indicative of the documents; and comparing the vectors.

5. A method for identifying documents that represent similar information to train a text-to-text application, the method comprising:

obtaining a group of documents;

determining reduced size versions of the documents, wherein the reduced size versions summarize information about words contained in the documents and the determining is performed by a processor;

comparing the reduced size versions to determine documents that represent similar information, wherein the comparing is performed by a processor; and using the documents that represent similar information for training for the text-to-text application, wherein determining the reduced size versions includes comparing words in the documents to specified dictionaries of words and defining the documents in terms of information about the words in the dictionaries.

6. The method of claim 5, wherein the reduced size versions include keys representing positions of words in the dictionaries.

7. The method of claim 6, further comprising changing an order of the keys prior to comparing the reduced size versions.

8. A system for identifying documents that represent similar information to train a text-to-text application, the system comprising:

a database including a group of documents;

a processor that determines reduced size versions of the documents and compares the reduced size versions to determine documents within the group that represent similar information, wherein the reduced size versions summarize information about words contained in the documents; and a text-to-text application module stored in memory and executable to use the documents that represent similar information for training a text-to-text application, wherein the text-to-text application is executable to carry out a rough translation to a second language of documents in the group to form a group of translated documents, and to compare the group of translated documents to other documents prior to determining the documents that represent similar information.

9. The system of claim 8, wherein the text-to-text application is a machine translation system.

10. The system of claim 8, wherein the text-to-text application module is executable to change an order of information within the reduced size versions prior to the comparing.

11. The system of claim 10, wherein the text-to-text application module is executable to sort the reduced size versions.

12. The system of claim 8 wherein the text-to-text application is executable to form vectors indicative of the documents, and compares the vectors.

13. A system for identifying documents that represent similar information to train a text-to-text application, the system comprising:

a database including a group of documents;

a processor that determines reduced size versions of the documents and compares the reduced size versions to determine documents within the group that represent similar information, wherein the reduced size versions summarize information about words contained in the documents;

a text-to-text application module stored in memory and executable to use the documents that represent similar information for training a text-to-text application; and a plurality of word dictionaries each having a plurality of words therein, and wherein the reduced size versions are determined at least in part by comparing words in the documents to words in the dictionaries.

14. The system of claim 13, wherein the reduced size versions include keys representing positions of words in the dictionaries.

15. The system of claim 14, wherein the text-to-text application module is executable to change an order of said keys prior to said comparing.

16. A method for identifying documents that represent similar information, the method comprising:

obtaining a first group of documents in a first language, and a second group of documents in a second language;

carrying out a rough translation to the first language of the second group of documents to form a third group of translated documents, the carrying out of the rough translation performed by a machine translation system;

determining reduced size versions of the first and third groups of documents, wherein the reduced size versions summarize information about words contained in the first and third groups of documents, and the determining is performed by a processor; and comparing the reduced size versions to determine documents that represent similar information, the comparing performed by a processor.

17. The method of claim 16, further comprising using the documents that represent similar information to train a text-to-text application system.

18. The method of claim 16, further comprising changing an order of information within the reduced size versions prior to determining the documents that represent similar information.

19. The method of claim 18, further comprising sorting the reduced size versions.

\* \* \* \* \*

UNITED STATES PATENT AND TRADEMARK OFFICE
CERTIFICATE OF CORRECTION

PATENT NO. : 7,813,918 B2
APPLICATION NO. : 11/197744
DATED : October 12, 2010
INVENTOR(S) : Ion Muslea et al.

It is certified that error appears in the above-identified patent and that said Letters Patent is hereby corrected as shown below:

In the Specification

Column 1, lines 5 through 10, reading "GOVERNMENT INTERESTS This invention was made with government support under Contract No. N66001-00-1-8914 awarded by the Space and Naval Warfare Systems Command. The U.S. government has certain rights in the claimed inventions." should be deleted.

Signed and Sealed this
Twenty-fourth Day of September, 2013

Teresa Stanek Rea
*Deputy Director of the United States Patent and Trademark Office*